(12) United States Patent
Song

(10) Patent No.: US 11,904,945 B2
(45) Date of Patent: Feb. 20, 2024

(54) OUTER PANEL AND FORMING METHOD THEREOF

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 29 days.

(21) Appl. No.: 17/859,261

(22) Filed: Jul. 7, 2022

(65) Prior Publication Data

US 2023/0202570 A1 Jun. 29, 2023

(30) Foreign Application Priority Data

Dec. 24, 2021 (KR) .................. 10-2021-0187725

(51) Int. Cl.
*B62D 25/02* (2006.01)
*B62D 65/00* (2006.01)

(52) U.S. Cl.
CPC ............ *B62D 25/02* (2013.01); *B62D 65/00* (2013.01)

(58) Field of Classification Search
CPC ........ B62D 25/02; B62D 65/00; B62D 65/02; B62D 25/04; B62D 27/065; B21D 5/16; B21D 39/021; B21D 53/88
USPC .................................................. 296/193.06
See application file for complete search history.

(56) References Cited

U.S. PATENT DOCUMENTS

| | | | | |
|---|---|---|---|---|
| 2,115,913 A | * | 5/1938 | Hicks ..................... | B62D 23/00 296/203.01 |
| 2,925,050 A | * | 2/1960 | Candlin, Jr. ........... | B61D 17/12 244/119 |
| 4,998,332 A | * | 3/1991 | Dacey, Jr. ............. | B62D 25/163 29/90.01 |
| 8,523,275 B2 | * | 9/2013 | Jorgensen ............... | B60J 1/007 296/193.06 |
| 10,597,090 B2 | * | 3/2020 | Son ....................... | B62D 29/008 |
| 2006/0043772 A1 | * | 3/2006 | Richardson .......... | B62D 29/002 296/187.02 |
| 2015/0246597 A1 | * | 9/2015 | Koike .................... | B60J 5/0402 49/459 |
| 2016/0167713 A1 | * | 6/2016 | Chung ................... | B62D 25/04 296/193.06 |
| 2020/0148274 A1 | * | 5/2020 | Ikeda .................... | B60R 13/025 |
| 2023/0182817 A1 | * | 6/2023 | Lee ...................... | B62D 25/2045 296/203.02 |

FOREIGN PATENT DOCUMENTS

RU 2700640 C1 * 9/2019 ............ B60R 13/04

* cited by examiner

*Primary Examiner* — Pinel E Romain
(74) *Attorney, Agent, or Firm* — Slater Matsil, LLP

(57) ABSTRACT

An embodiment outer panel assembled to a vehicle body frame includes an outer plate portion, a plurality of flange portions extending from an edge portion of the outer plate portion and bent toward the vehicle body frame, and a fastening member installed in the flange portions and engaged to the vehicle body frame.

19 Claims, 24 Drawing Sheets

OUTER PANEL AND FORMING METHOD THEREOF

CROSS-REFERENCE TO RELATED APPLICATIONS

This application claims the benefit of Korean Patent Application No. 10-2021-0187725, filed on Dec. 24, 2021, which application is hereby incorporated herein by reference.

TECHNICAL FIELD

An embodiment of the present invention relates to a vehicle body.

BACKGROUND

Recently, the vehicle industry has introduced a new concept of future mobility vision for realizing a dynamic human-centered future city. One of these future mobility solutions is a purpose-built vehicle (PBV) for purpose-based mobility.

The PBV is an environment-friendly vehicle that provides a customized service for passengers during a period in which they travel to their destination, and is typically electric vehicle-based.

The vehicle body of the PBV is manufactured in a box shape having a wide interior space. A vehicle body of the PBV includes an underbody (which is frequently called a rolling chassis or a skateboard) and an upper body mounted on the underbody.

For example, the vehicle body of the PBV includes a front swing door mounted on one side structure body of the upper body and a rear sliding door mounted on another side structure body. A fixed glass is applied to a portion (e.g., a door-less portion) to which no door is applied on the respective sides of the side structure body.

Regarding the vehicle body of the PBV, the upper body includes a vehicle body frame made of a steel material, and at least one outer panel assembly assembled to the vehicle body frame. The at least one outer panel assembly may be assembled to the vehicle body frame of the portion to which no door is applied in the vehicle body of the PBV.

For example, the at least one outer panel assembly may include an inner panel made of a steel material welded to the vehicle body frame, and an outer panel made of a plastic complex material mechanically bonded to an external side of the inner panel made of a steel material. Here, the inner panel made of a steel material may maintain watertightness and airtightness inside and outside the vehicle body.

According to conventional art, a welding gun, a sealer gun, and an assembly component fail to enter the portion of the vehicle body to which no door is applied by at least one outer panel assembly in a vehicle body assembly line, an assembly component assembly line, and a painting line.

The above information disclosed in this background section is only for enhancement of understanding of the background of the invention, and therefore it may contain information that does not form the prior art that is already known to a person of ordinary skill in the art.

SUMMARY

An embodiment of the present invention relates to a vehicle body. Particular embodiments relate to an outer panel assembled to a vehicle body of a purpose-built vehicle (PBV) and a method for forming the same.

Embodiments of the present invention can provide an outer panel attachable to/detachable from a vehicle body frame for performing fluent process work in an assembly component assembly line and a painting line.

Embodiments of the present invention can provide a method for forming an outer panel for reducing a number of parts of a vehicle body and reducing weight of the vehicle body.

An embodiment of the present invention provides an outer panel assembled to a vehicle body frame including: i) an outer plate portion; ii) a plurality of flange portions extending from an edge portion of the outer plate portion and bent toward the vehicle body frame; and iii) a fastening member installed in the flange portions and engaged to the vehicle body frame.

The outer panel may further include a sealing member combined to edge ends of the flange portions and sealing cracks among the flange portions and the vehicle body frame.

One of the flange portions may be combined to a glass support member installed in a glass mounted area of the vehicle body frame.

One of the flange portions may include a glass supporting flange extending from the edge portion of the outer plate portion and bent to be spaced from the edge portion with a predetermined first gap therebetween and an undercut extending from the glass supporting flange and bent to be spaced from the outer plate portion with a second gap that is greater than the first gap.

The glass supporting flange may have a U-shape.

A remainder of the flange portions may be combined to a center pillar, a rear pillar, and a side seal installed in the vehicle body frame.

The respective remainder of the flange portions may include a first portion extending from the edge portion of the outer plate portion and overlapping the edge portion, a second portion extending toward the vehicle body frame from the first portion, and a third portion extending from the second portion and spaced from the edge portion of the outer plate portion with a predetermined gap.

The outer plate portion may have a rectangular shape.

The outer panel may further include a plurality of die ejecting sections formed among the flange portions at respective corner portions of the outer plate portion.

The fastening member may include a weld bolt inserted into the vehicle body frame and engaged to a nut.

Another embodiment of the present invention provides a method for forming the above-described outer panel including: (a) providing a formed plate on which a hemming processor is formed; (b) providing a forming mold including a lower die, an upper sliding die installed to slide in a horizontal direction on an upper side of the lower die, and a sliding core installed to slide in the horizontal direction and a perpendicular direction corresponding to the lower die; and (c) loading the formed plate on the lower die, slide-moving the upper sliding die and the sliding core in the horizontal direction, and hemming-processing the hemming processor.

The method may further include (d) moving the sliding core upward and horizontally, and forming a plurality of flange portions on the formed plate.

The method may further include, after (d), (e) ejecting the upper sliding die from the flange portions through a die ejecting section installed among the flange portions.

The embodiments of the present invention may reduce the number of parts of the vehicle body and may reduce the weight of the vehicle body, and may further increase assembling productivity for the respective processes of the vehicle body.

Effects that can be obtained or expected from embodiments of the present invention are directly or suggestively described in the following detailed description. That is, various effects expected from embodiments of the present invention will be described in the following detailed description.

BRIEF DESCRIPTION OF THE DRAWINGS

The drawings are provided for reference in describing exemplary embodiments of the present invention, and the spirit of the present invention should not be construed only by the accompanying drawings.

Figure 1A:
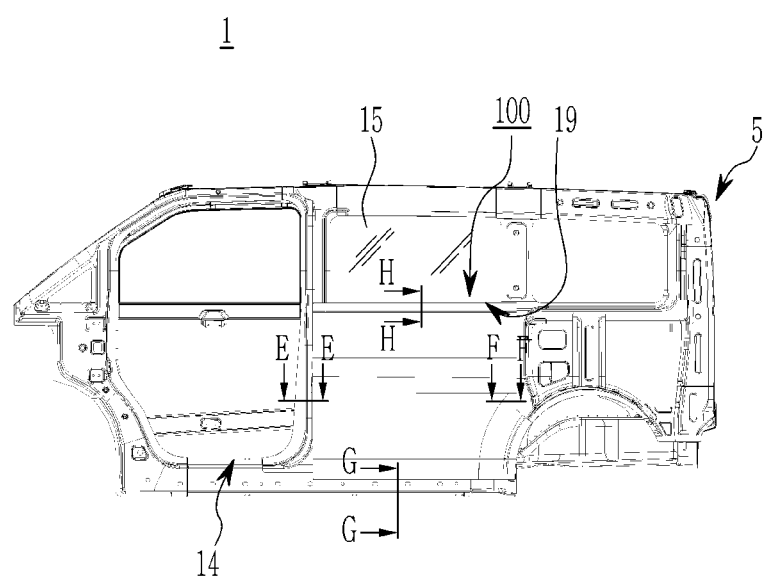
FIGS. 1A and 1B show an example of a vehicle body to which an outer panel according to an embodiment of the present invention is assembled.

It should be understood that the above-referenced drawings are not necessarily to scale, presenting a somewhat simplified representation of various preferred features illustrative of the basic principles of the disclosure. The specific design features of embodiments of the present disclosure, including, for example, specific dimensions, orientations, locations, and shapes, will be determined in part by the particular intended application and use environment.

The following reference identifiers may be used in connection with the accompanying drawings to describe exemplary embodiments of the present disclosure.

1: vehicle body
5: upper body
G1, G2: first gap and second gap
10: vehicle body frame
11: center pillar
11a: center pillar outer member
12: rear pillar
12a: rear pillar outer member
13: side seal
13a: seal outer member
14: door mounted unit
15: glass
17: glass support member
17a: forming portion
19: glass mounted area
20: outer plate portion
21: inner side
22: outer side
31, 32, 33, 34: first, second, third, and fourth flange portions
41, 42, 43: first, second, and third portions
45: glass supporting flange
47: undercut
50: die ejecting section
60: fastening member
61: weld bolt
63: nut
65: tooling pin
70: sealing member
71: adhesive
81: hemming processor
83: formed plate
90: forming mold
91: lower die
93: upper sliding die
95: sliding core
100: outer panel

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present disclosure. As used herein, the singular forms are intended to include the plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly through one or more intermediary components, for example, by welding, self-piercing rivets (SPR), flow drill screws (FDS), structural adhesives, and the like.

The terms "vehicle", "of a vehicle", "automobile", or other similar terms used herein are generally used to cover various vehicles such as passenger vehicles including sports cars, sport utility vehicles (SUVs), buses, trucks, commercial vehicles, and the like, and cover hybrid vehicles, electric vehicles, hybrid electric vehicles, fuel cell electric vehicles, and other alternative fuel vehicles (i.e., vehicles driven by a fuel derived from resources other than petroleum).

Embodiments of the present invention will now be described in detail with reference to accompanying drawings.

Figure 1B:
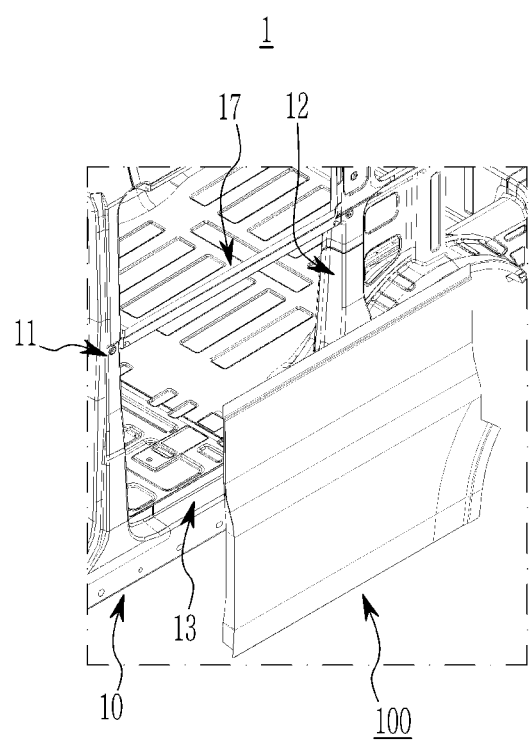

FIGS. 1A and 1B show an example of a vehicle body to which an outer panel according to an embodiment of the present invention is assembled.

Referring to FIGS. 1A and 1B, for example, an outer panel 100 according to an embodiment of the present invention may be applied to the vehicle body 1 of the purpose built vehicle (PBV).

The PBV may be defined as an environment-friendly vehicle that is electric vehicle-based and provides a customized service for passengers while traveling to a destination. The PBV may be designed to have a box shape with a wide interior space.

The vehicle body 1 of the PBV includes a skateboard type underbody (not shown) and an upper body 5 assembled to the underbody.

The underbody, also referred to as a rolling chassis, may include a chassis frame (not shown) on which a battery assembly (not shown) is mounted. The upper body 5 is combined to the underbody and includes a vehicle body frame 10 configuring a cabin.

In the present specification, for example, a reference direction for describing constituent elements may be set to be a vehicle body front and rear direction (e.g., a vehicle body length direction), a vehicle width direction, and a perpendicular direction.

"Upper end portion", "upper portion", "upper end", or "upper portion surface" of a component indicates an end portion, a portion, an end, or a surface of the component that is relatively positioned higher in the drawing, and "lower end portion", "lower portion", "lower end", or "lower portion surface" of a component indicates an end portion, a portion, an end, or a surface of the component that is positioned relatively lower in the drawing.

"End" (for example, one end, another end, or the like) of a component indicates an end of the component in any direction, and "end portion" (for example, one end portion, another end portion, or the like) of a component indicates a certain part of the component including the end.

Regarding the upper body 5, the vehicle body frame 10 may include a side assembly, and a loop assembly assembled to the side assembly.

The vehicle body frame 10 may include a center pillar 11, a rear pillar 12, a side seal 13, and a door mounted unit 14 provided to the side assembly. The center pillar 11 and the rear pillar 12 may be provided on the portion to which no door is applied, regarding the side assembly of the vehicle body frame 10.

The center pillar 11 and the rear pillar 12 are connected through a glass support member 17 disposed in the vehicle body front and rear direction to support the glass 15. The glass support member 17 is installed in a glass mounted area 19 in the vehicle body frame 10.

The outer panel 100 is assembled to the vehicle body frame 10. The outer panel 100 is made of a steel plate. The outer panel 100 may be assembled to the center pillar 11, the rear pillar 12, the side seal 13, and the glass support member 17.

The outer panel 100 may be attached to/detached from the vehicle body frame 10 so that a process work may be fluently performed in the vehicle body assembly line, the assembly component assembly line, and the painting line.

Figure 2:
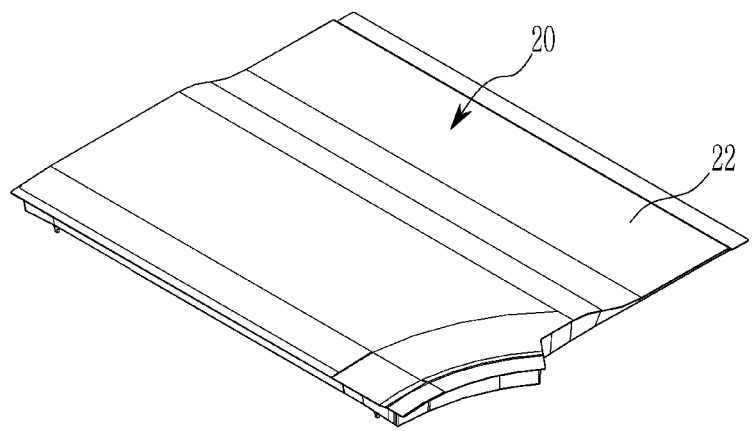
FIG. 2 and FIG. 3 show perspective views of an outer panel according to an embodiment of the present invention.
Figure 3:
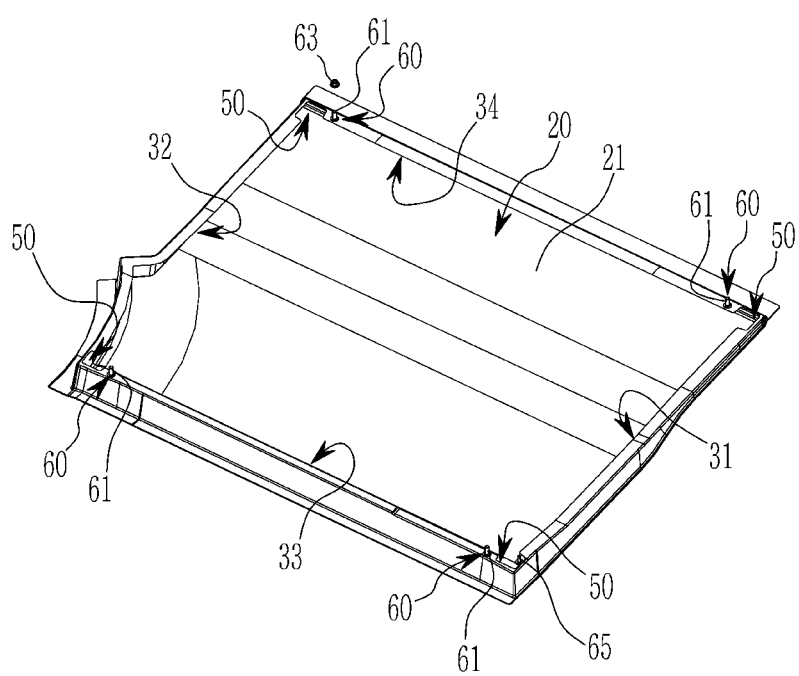
Figure 4:
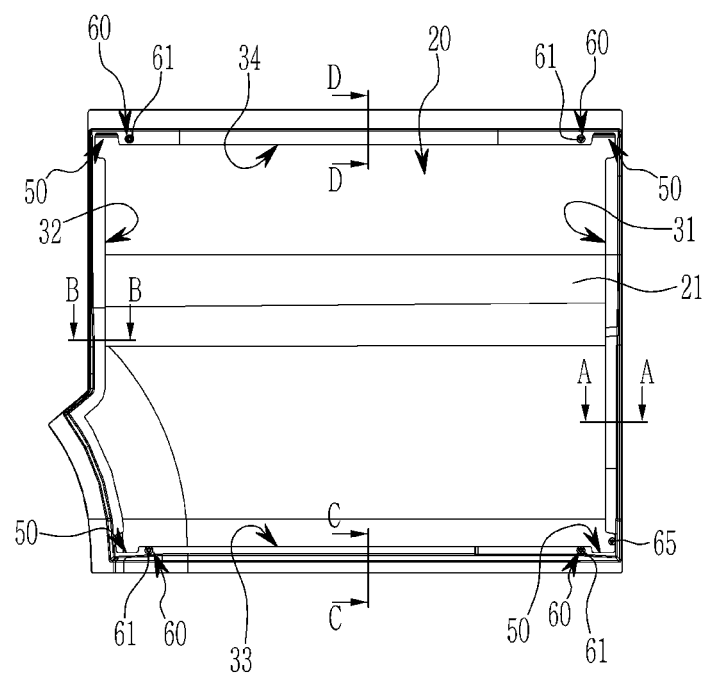
FIG. 4 shows a top plan view of an inner side of an outer panel according to an embodiment of the present invention.

FIG. 2 and FIG. 3 show perspective views of an outer panel according to an embodiment of the present invention, and FIG. 4 shows a top plan view of an inner side of an outer panel according to an embodiment of the present invention.

Referring to FIG. 1A to FIG. 4, the outer panel 100 basically includes an outer plate portion 20, a plurality of flange portions 31, 32, 33, and 34, a plurality of die ejecting sections 50, a fastening member 60, and a sealing member 70.

The outer plate portion 20 may be formed to be a planar side as an example, and may be formed to be a curved side that is curved in a round shape at a predetermined portion as another example.

The outer plate portion 20 includes an inner side 21 corresponding to the vehicle body frame 10, and an outer side 22 provided as a skin side. The outer plate portion 20 may, for example, have a rectangular shape.

The flange portions 31, 32, 33, and 34 are substituted with a steel inner panel for controlling watertightness and airtightness of the inside and the outside of the vehicle body 1 in a like way of the conventional art.

The respective flange portions 31, 32, 33, and 34 are integrally connected to an edge portion of the outer plate portion 20. The flange portions 31, 32, 33, and 34 extend from the edge portion of the outer plate portion 20 and are bent toward the vehicle body frame 10.

The flange portions 31, 32, 33, and 34 may be formed by a hemming process caused by a forming mold to be described.

The flange portions 31, 32, 33, and 34 may be distinguished into a first flange portion 31, a second flange portion 32, a third flange portion 33, and a fourth flange portion 34.

From among the flange portions 31, 32, 33, and 34, the first flange portion 31 may be combined to the center pillar 11 of the vehicle body frame 10. The second flange portion 32 may be combined to the rear pillar 12 of the vehicle body frame 10. The third flange portion 33 may be combined to the side seal 13 of the vehicle body frame 10.

Figure 5:
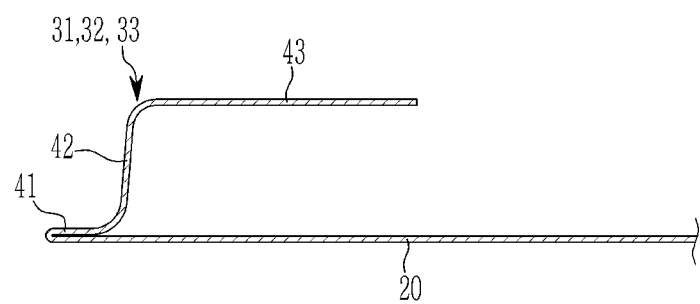
FIG. 5 shows a cross-sectional view of a flange portion applied to an outer panel with respect to lines A-A, B-B, and C-C of FIG. 4 according to an embodiment of the present invention.

As shown in FIG. 5, the first flange portion 31, the second flange portion 32, and the third flange portion 33 respectively include a first portion 41, a second portion 42, and a third portion 43.

The first portion 41 extends from an edge portion of the outer plate portion 20 and is bent to overlap the edge portion. The second portion 42 extends (e.g., is bent) toward the vehicle body frame 10 from the first portion 41. Here, a person skilled in the art may refer to the first portion 41 and the second portion 42 as plate undercuts.

The third portion 43 extends from the second portion 42 and is bent to be spaced from the edge portion of the outer plate portion 20 with a predetermined gap therebetween. The third portion 43 may be respectively combined to the center pillar 11, the rear pillar 12, and the side seal 13 of the vehicle body frame 10.

In another way, the fourth flange portion 34 from among the flange portions 31, 32, 33, and 34 may be combined to the glass support member 17 of the vehicle body frame 10.

Figure 6:
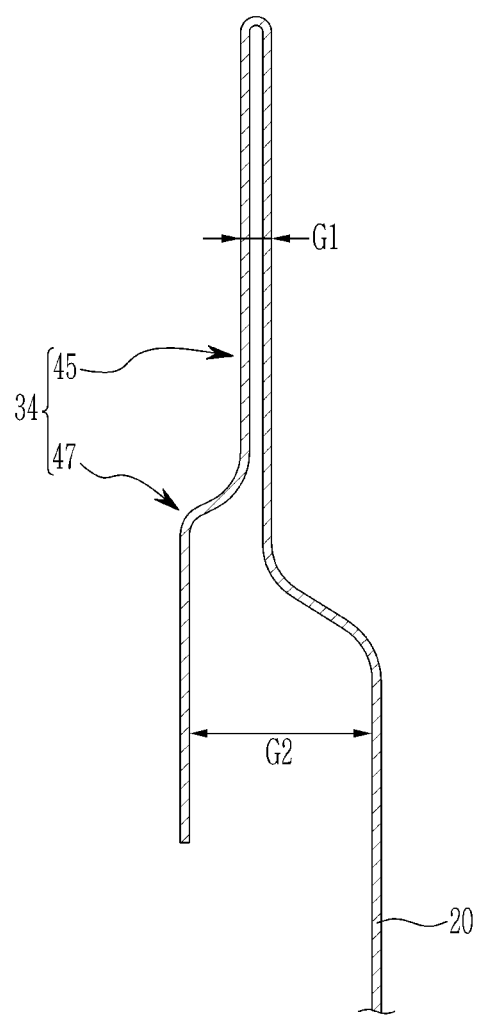
FIG. 6 shows a cross-sectional view of a flange portion applied to an outer panel with respect to a line D-D of FIG. 4 according to an embodiment of the present invention.

The fourth flange portion 34 includes a glass supporting flange 45 and an undercut 47, as shown in FIG. 6.

The glass supporting flange 45 extends from the edge portion of the outer plate portion 20 and is bent to be spaced from the edge portion with a predetermined first gap G1 therebetween. For example, the glass supporting flange 45 may have a U-shape.

The undercut 47 extends from the glass supporting flange 45, and is bent to be spaced from the outer plate portion 20 with a second gap G2 that is greater than the first gap G1.

Referring to FIG. 4, when hemming-processing the flange portions 31, 32, 33, and 34 by a forming mold, the die ejecting sections 50 may fluently eject the forming mold from the hemming-processed flange portions 31, 32, 33, and 34.

The respective die ejecting sections 50 may be formed between the flange portions 31, 32, 33, and 34 corresponding to each other at respective corner portions of the outer plate portion 20 in a rectangular shape.

Here, the respective die ejecting sections 50 may be made by a chamfer process known to a person skilled in the art.

Referring to FIG. 1A to FIG. 4, the fastening members 60 engage the respective flange portions 31, 32, 33, and 34 to the vehicle body frame 10. The fastening members 60 are installed in the flange portions 31, 32, 33, and 34, respectively.

The respective flange portions 31, 32, 33, and 34 may be engaged to the center pillar 11, the rear pillar 12, the side seal 13, and the glass support member 17 of the vehicle body frame 10 by the fastening members 60.

The fastening members 60 each may include a weld bolt 61 welded to the flange portions 31, 32, 33, and 34. The weld bolt 61 may be inserted into the center pillar 11, the rear pillar 12, the side seal 13, and the glass support member 17 of the vehicle body frame 10, and may be engaged to the nut 63.

A tooling pin 65 may be installed in at least one of the flange portions 31, 32, 33, and 34. The tooling pin 65 may be inserted into a tooling hole (e.g., a reference hole) (not shown) installed in the vehicle body frame 10 when the outer panel 100 is assembled.

FIG. 7 to FIG. 10 show cross-sectional views of a sealing member portion applied to an outer panel with respect to lines E-E, F-F, G-G, and H-H of FIG. 1 according to an embodiment of the present invention.

Referring to FIG. 7 to FIG. 10, the sealing member 70 seals cracks among the flange portions 31, 32, 33, and 34 and the vehicle body frame 10.

The sealing member 70 is combined to the edge ends of the flange portions 31, 32, 33, and 34. The sealing member 70 may include a weather strip (also referred to as a seal strip) known to a person skilled in the art.

For example, the sealing member 70 may be installed with a weather strip in a rectangular shape corresponding to the shape of the outer plate portion 20, and may be sequentially combined to the edge ends of the flange portions 31, 32, 33, and 34.

For another example, the sealing member 70 includes a plurality of weather strips with lengths corresponding to the flange portions 31, 32, 33, and 34, and it may be combined to the edge ends of the flange portions 31, 32, 33, and 34.

Figure 7:
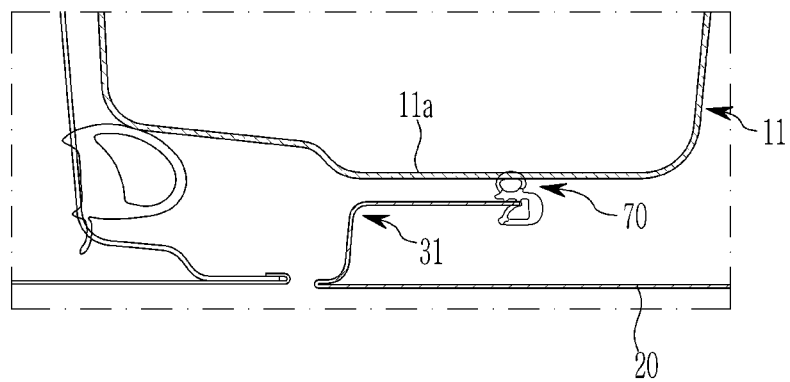
FIG. 7 shows a cross-sectional view of a sealing member portion applied to an outer panel with respect to a line E-E of FIG. 1 according to an embodiment of the present invention.
Figure 8:
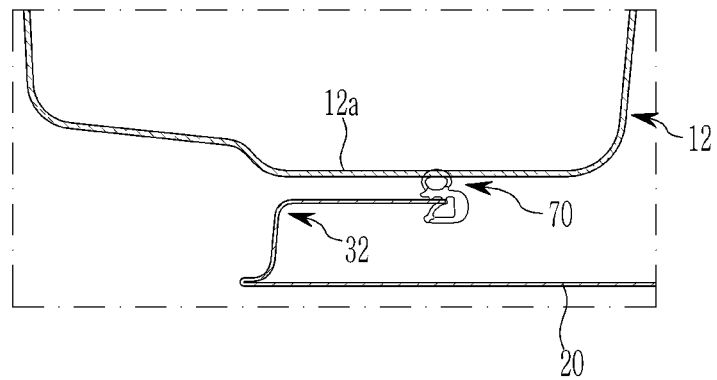
FIG. 8 shows a cross-sectional view of a sealing member portion applied to an outer panel with respect to a line F-F of FIG. 1 according to an embodiment of the present invention.
Figure 9:
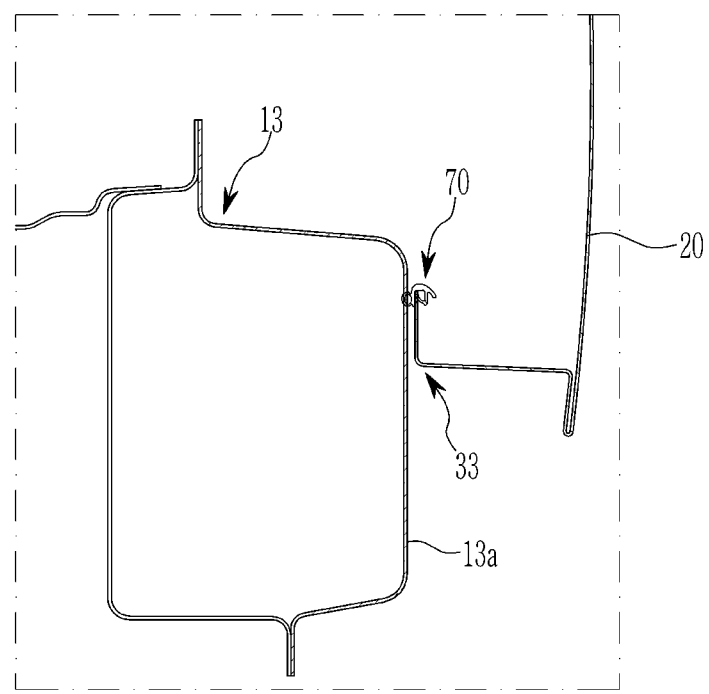
FIG. 9 shows a cross-sectional view of a sealing member portion applied to an outer panel with respect to a line G-G of FIG. 1 according to an embodiment of the present invention.

As shown in FIG. 7, the sealing member 70 may seal cracks between a center pillar outer member 11a of the center pillar 11 and the first flange portion 31. As shown in FIG. 8, the sealing member 70 may seal the cracks between a rear pillar outer member 12a of the rear pillar 12 and the second flange portion 32. As shown in FIG. 9, the sealing member 70 may seal the cracks between a seal outer member 13a of the side seal 13 and the third flange portion 33.

Figure 10:
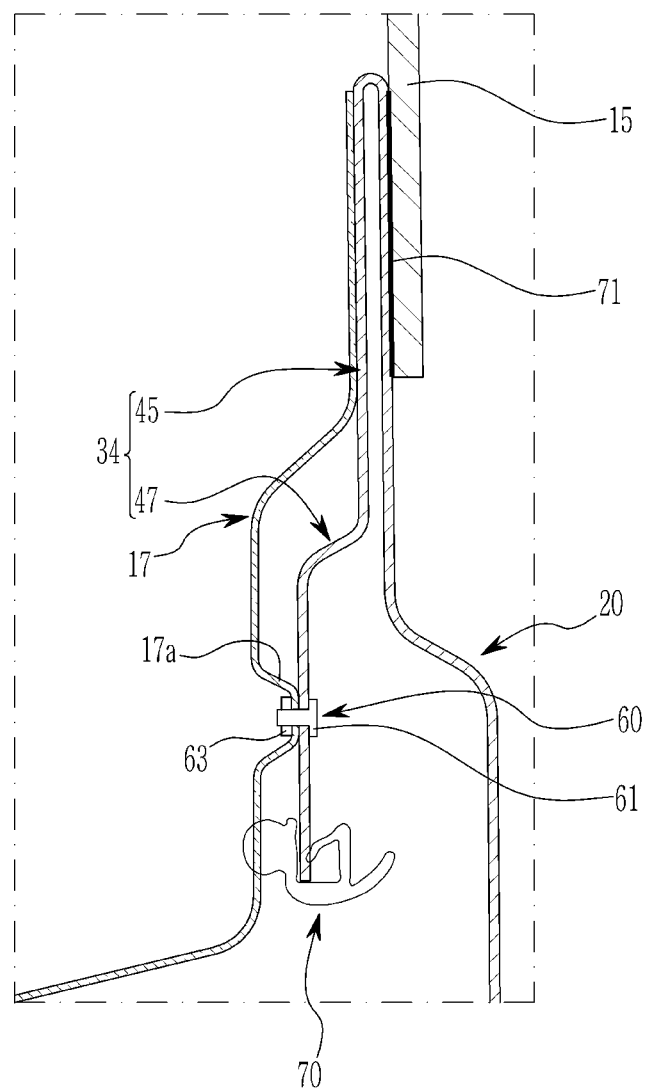
FIG. 10 shows a cross-sectional view of a sealing member portion applied to an outer panel with respect to a line H-H of FIG. 1 according to an embodiment of the present invention.

As shown in FIG. 10, the sealing member 70 may seal the cracks between the glass support member 17 and the fourth flange portion 34.

The glass supporting flange 45 of the fourth flange portion 34 is adhered to the glass 15 through an adhesive 71. The glass supporting flange 45 has a U-shape, thereby absorbing an external force applied to the glass 15.

The undercut 47 of the fourth flange portion 34 may be engaged to the glass support member 17 by the fastening member 60. The undercut 47 may be engaged to a forming portion 17a protruding from the glass support member 17 by the fastening member 60.

A method for forming an outer panel 100 according to an embodiment of the present invention will now be described with reference to FIG. 11 to FIG. 20B.

FIG. 11 to FIG. 20B show a method for forming an outer panel according to an embodiment of the present invention.

Figure 11:
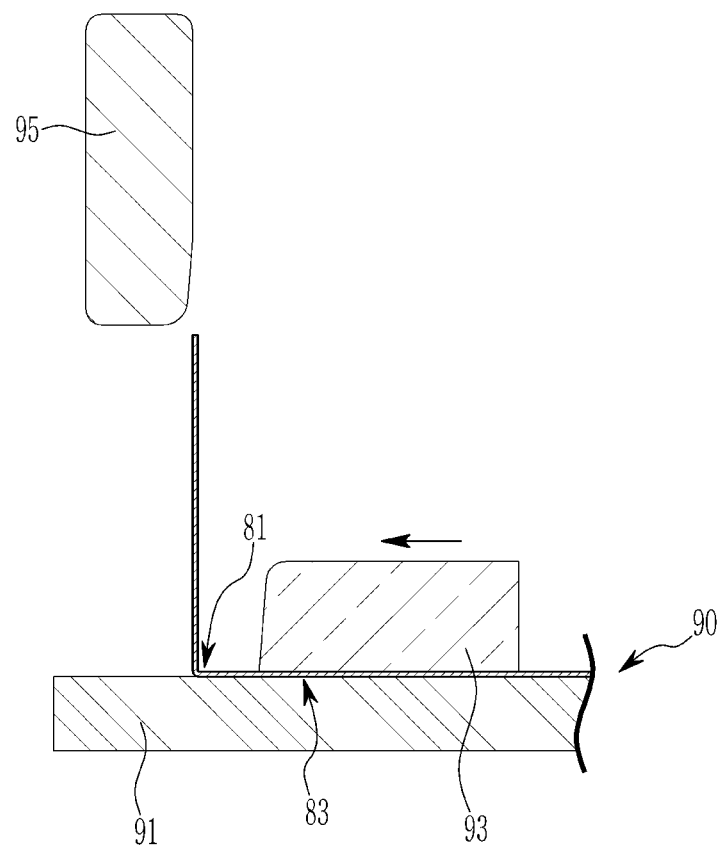
FIG. 11 to FIG. 20B show a method for forming an outer panel according to an embodiment of the present invention.

Referring to FIG. 11, a formed plate 83 on which a hemming processor 81 is formed is provided. A forming mold 90 including a lower die 91, an upper sliding die 93, and a sliding core 95 is provided.

The lower die 91 supports the formed plate 83. The formed plate 83 is loaded on an upper side of the lower die 91.

The upper sliding die 93 is installed to be movable back and forth in a sliding way in a horizontal direction that is set on an upper side of the lower die 91. The formed plate 83 is fixed on the upper side of the lower die 91 by the upper sliding die 93 having moved in the horizontal direction.

The sliding core 95 is installed to be movable back and forth in a sliding way in a horizontal direction and a perpendicular direction corresponding to the lower die 91 and the upper sliding die 93. The sliding core 95 is moved upward corresponding to the lower die 91 and the upper sliding die 93.

Figure 12:
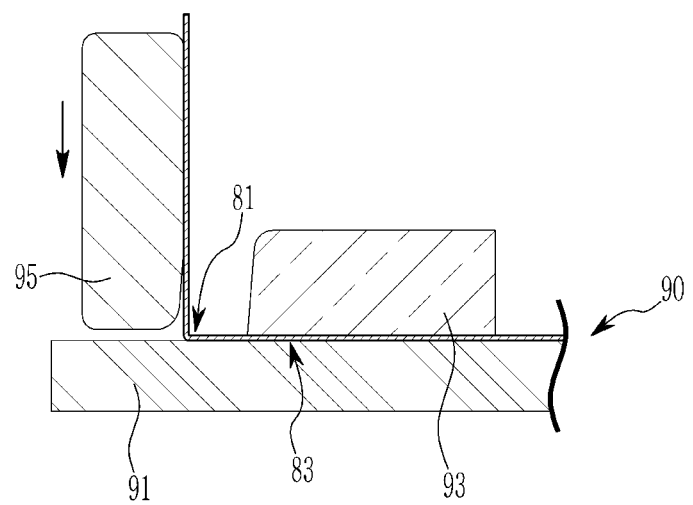

Referring to FIG. 12, while in the above-described state, the sliding core 95 moves downward.

Figure 13:
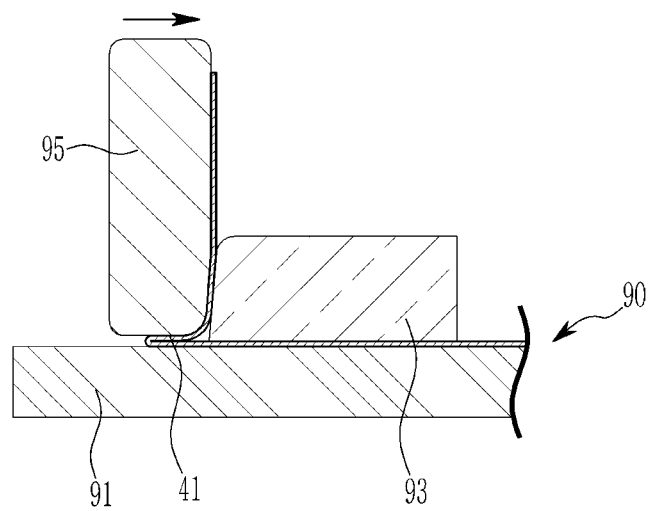

Referring to FIG. 13, the sliding core 95 and the upper sliding die 93 move in opposite horizontal directions. The upper sliding die 93 and the sliding core 95 hemming-processes the hemming processor 81 as shown in FIG. 12, and form the first portion 41.

Figure 14:
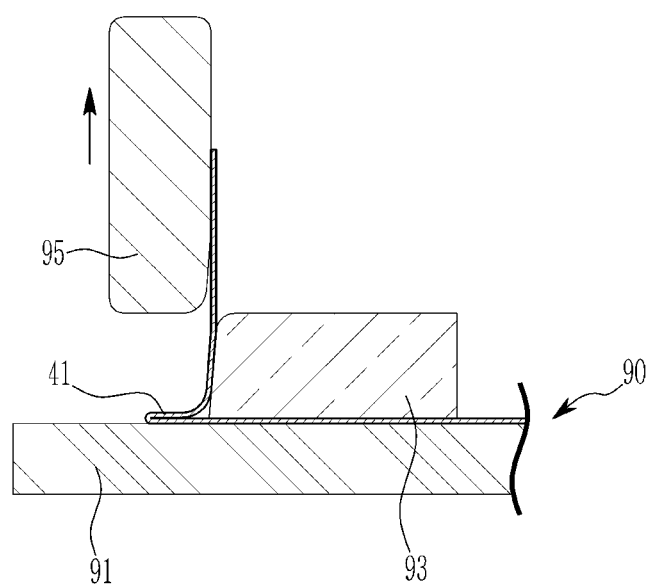

Referring to FIG. 14, the sliding core 95 moves upward.

Figure 15:
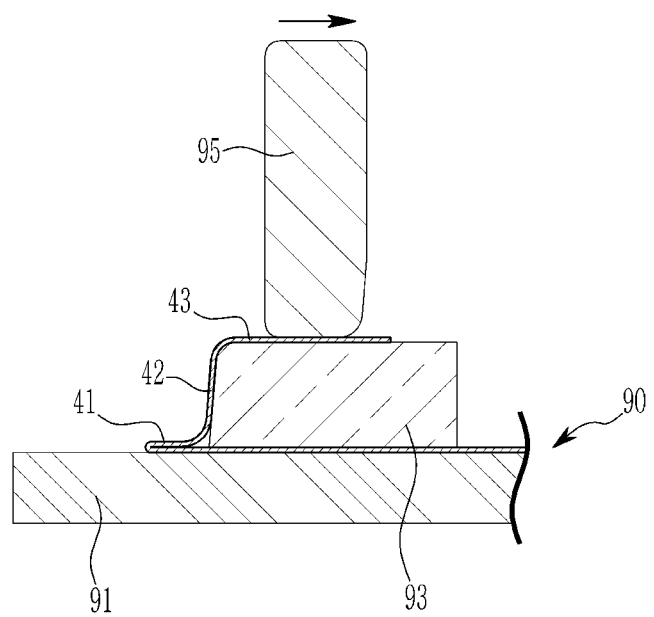

Referring to FIG. 15, the sliding core 95 moves in the horizontal direction that is opposite to the direction in which the upper sliding die 93 moves. The sliding core 95 forms the second portion 42 and the third portion 43 extending from the first portion 41.

Figure 16:
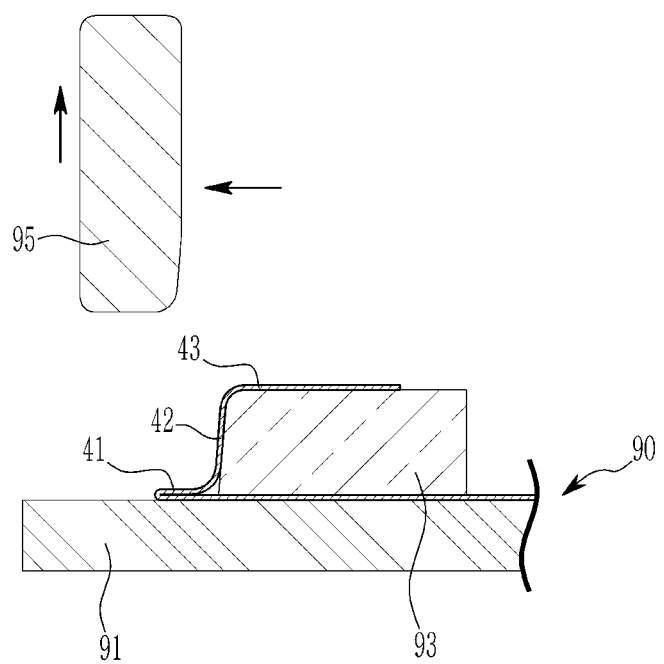
Figure 17:
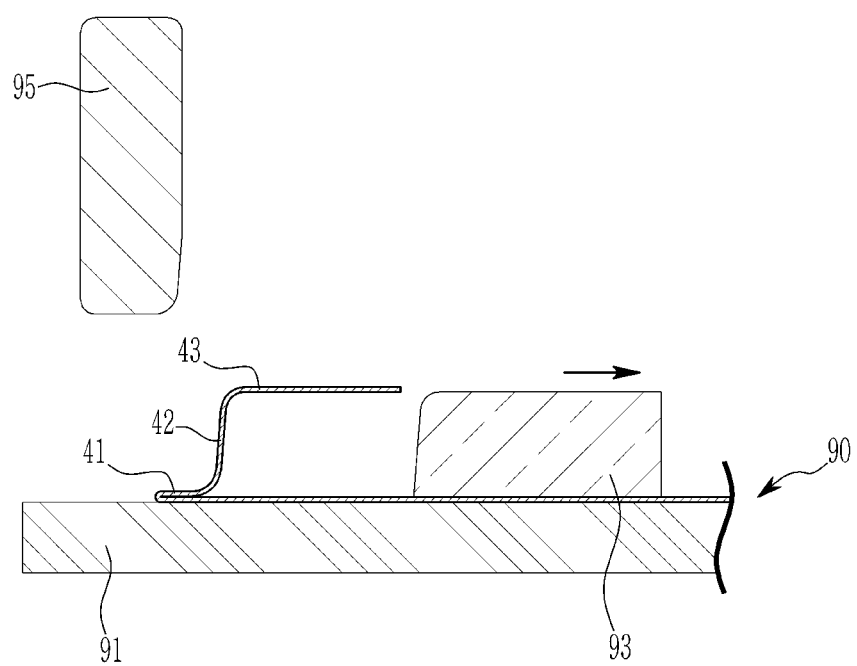
Figure 18A:
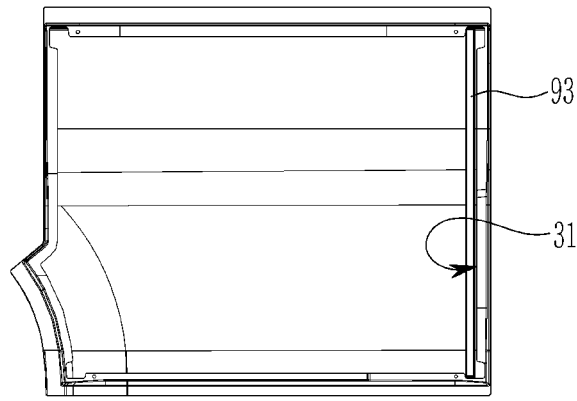
Figure 18B:
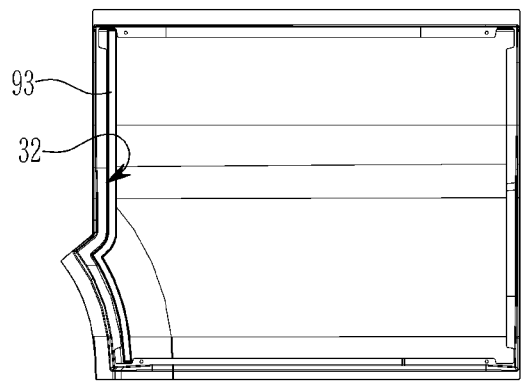
Figure 19A:
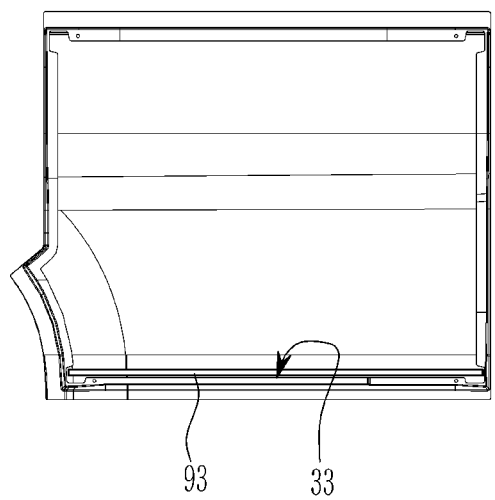
Figure 19B:
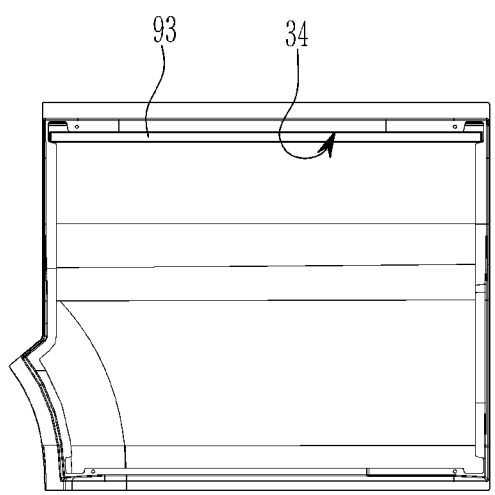
Figure 20A:
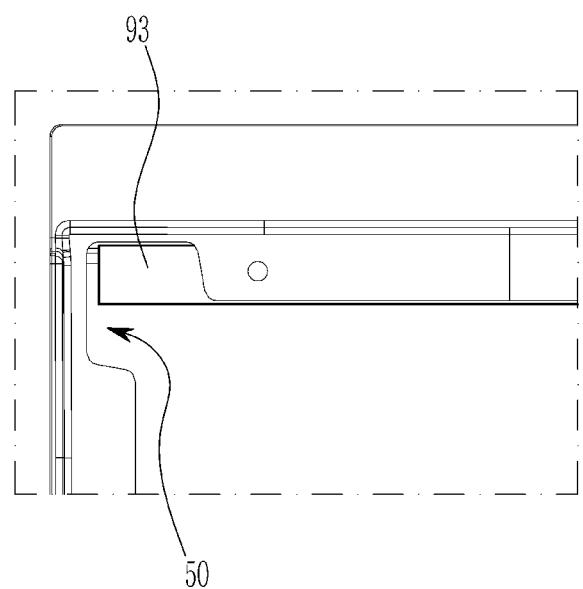
Figure 20B:
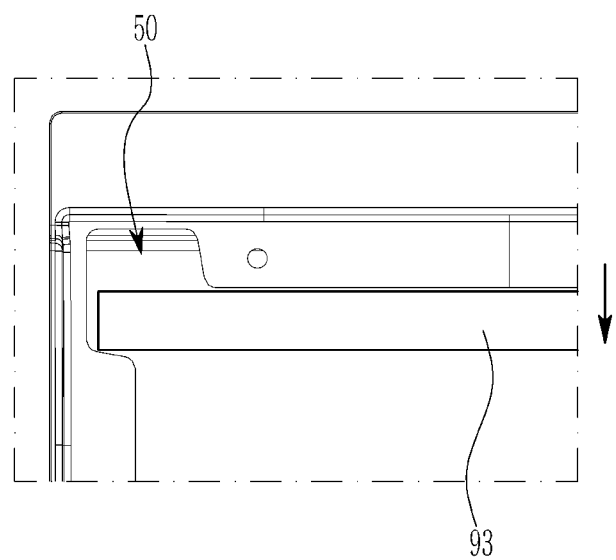

Referring to FIG. 16, the sliding core 95 moves upward and horizontally and returns then to its original position. Referring to FIG. 17, the upper sliding die 93 moves in the horizontal direction, and returns to its original position.

Therefore, as shown in FIG. 5, the forming mold 90 may form the first flange portion 31, the second flange portion 32, and the third flange portion 33 including the first portion 41, the second portion 42, and the third portion 43 on the edge portion of the outer plate portion 20.

The forming mold 90 may, as shown in FIG. 6, form the fourth flange portion 34 including the glass supporting flange 45 and the undercut 47 on the edge portion of the outer plate portion 20 through the above-described processes.

While the formation of the flange portions 31, 32, 33, and 34 is finished, the upper sliding die 93 of the forming mold 90 is positioned inside the respective flange portions 31, 32, 33, and 34, as shown in FIGS. 18A, 18B, 19A, and 19B.

As shown in FIG. 18A to FIG. 20B, the upper sliding die 93 may move in the horizontal direction, and may be easily ejected to the outside of the flange portions 31, 32, 33, and 34 from the inside thereof by a plurality of die ejecting sections 50.

Regarding the above-described outer panel 100, the integrally formed flange portions 31, 32, 33, and 34 are included in the edge portion of the outer plate portion 20.

The outer panel 100 may be separately mounted on the vehicle body 1 in a like way of the conventional art to substitute the inner panel made of a steel material for controlling the watertightness and airtightness of the inside/outside of the vehicle body 1 with the flange portions 31, 32, 33, and 34.

The outer panel 100 is assembled to the vehicle body frame 10 of the vehicle body 1 through the flange portions 31, 32, 33, and 34, and the inner panel made of a steel material according to conventional art may be removed, thereby reducing the number of the parts and reducing the weight of the vehicle body 1.

The outer panel 100 may be attached to/detached from the vehicle body frame 10 of the vehicle body 1 by the fastening member 60. For example, the outer panel 100 may be detached from the vehicle body frame 10 of the vehicle body 1 in the vehicle body assembly line, the assembly component assembly line, and the painting line.

The outer panel 100 may be engaged to the vehicle body frame 10 by the fastening member 60, and as another example, it may be attached to/detached from the vehicle body frame 10 through the adhesive.

Therefore, regarding the outer panel 100, the welding gun, the sealer gun, and the assembly component may fluently enter the portion of the vehicle body 1 to which no door is applied in the vehicle body assembly line, the assembly component assembly line, and the painting line, thereby further increasing productivity for respective processes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An outer panel assembled to a vehicle body frame, the outer panel comprising:
   an outer plate portion having a rectangular shape;
   a plurality of flange portions extending from an edge portion of the outer plate portion and bent toward the vehicle body frame;
   a fastening member installed in the flange portions and engaged to the vehicle body frame; and
   a plurality of die ejecting sections formed among the flange portions at respective corner portions of the outer plate portion.

2. The outer panel of claim 1, further comprising a sealing member combined to edge ends of the flange portions and sealing cracks among the flange portions and the vehicle body frame.

3. The outer panel of claim 1, wherein one a first flange portion of the flange portions is combined to a glass support member installed in a glass mounted area of the vehicle body frame.

4. The outer panel of claim 3, wherein the first flange portion comprises:
   a glass supporting flange extending from the edge portion of the outer plate portion and bent to be spaced from the edge portion with a predetermined first gap therebetween; and
   an undercut extending from the glass supporting flange and bent to be spaced from the outer plate portion with a second gap that is greater than the first gap.

5. The outer panel of claim 4, wherein the glass supporting flange has a U-shape.

6. The outer panel of claim 3, wherein second flange portions of the flange portions are combined to a center pillar, a rear pillar, and a side seal installed in the vehicle body frame.

7. The outer panel of claim 6, wherein each of the second flange portions comprises:
   a first portion extending from the edge portion of the outer plate portion and overlapping the edge portion;
   a second portion extending toward the vehicle body frame from the first portion; and
   a third portion extending from the second portion and spaced from the edge portion of the outer plate portion with a predetermined gap.

8. The outer panel of claim 1, wherein the fastening member comprises a weld bolt inserted into the vehicle body frame and engaged to a nut.

9. A method for forming an outer panel, the method comprising:
   providing a formed plate on which a hemming processor is formed;
   providing a forming mold including a lower die, an upper sliding die installed to slide in a horizontal direction on an upper side of the lower die, and a sliding core installed to slide in the horizontal direction and a perpendicular direction corresponding to the lower die; and
   loading the formed plate on the lower die, slide-moving the upper sliding die and the sliding core in the horizontal direction, and hemming-processing the hemming processor.

10. The method of claim 9, further comprising moving the sliding core upward and horizontally and forming a plurality of flange portions on the formed plate.

11. The method of claim 10, further comprising, after moving the sliding core upward and horizontally and forming the plurality of flange portions on the formed plate, ejecting the upper sliding die from the flange portions through a die ejecting section installed among the flange portions.

12. A method for forming an outer panel, the method comprising:
   forming a plurality of flange portions extending from an edge portion of an outer plate portion and bent toward a vehicle body frame, wherein forming the plurality of flange portions comprises:
      providing a formed plate on which a hemming processor is formed;
      providing a forming mold including a lower die, an upper sliding die installed to slide in a horizontal direction on an upper side of the lower die, and a sliding core installed to slide in the horizontal direction and a perpendicular direction corresponding to the lower die;
      loading the formed plate on the lower die, slide-moving the upper sliding die and the sliding core in the horizontal direction, and hemming-processing the hemming processor; and
      moving the sliding core upward and horizontally and forming the plurality of flange portions on the formed plate; and
   installing a fastening member in the flange portions and engaged to the vehicle body frame.

13. The method of claim 12, further comprising, after moving the sliding core upward and horizontally and forming the plurality of flange portions on the formed plate, ejecting the upper sliding die from the flange portions through a die ejecting section installed among the flange portions.

14. The method of claim 12, further comprising combining a sealing member to edge ends of the flange portions and sealing cracks among the flange portions and the vehicle body frame.

15. The method of claim 12, further comprising combining a first flange portion of the flange portions to a glass support member installed in a glass mounted area of the vehicle body frame.

16. The method of claim 15, wherein the first flange portion comprises:
   a glass supporting flange extending from the edge portion of the outer plate portion and bent to be spaced from the edge portion with a predetermined first gap therebetween; and
   an undercut extending from the glass supporting flange and bent to be spaced from the outer plate portion with a second gap that is greater than the first gap.

17. The method of claim 16, wherein the glass supporting flange has a U-shape.

18. The method of claim 15, further comprising combining second flange portions of the flange portions to a center pillar, a rear pillar, and a side seal installed in the vehicle body frame.

19. The method of claim 18, wherein each of the second flange portions comprises:
   a first portion extending from the edge portion of the outer plate portion and overlapping the edge portion;
   a second portion extending toward the vehicle body frame from the first portion; and
   a third portion extending from the second portion and spaced from the edge portion of the outer plate portion with a predetermined gap.

* * * * *

UNITED STATES PATENT AND TRADEMARK OFFICE
CERTIFICATE OF CORRECTION

PATENT NO. : 11,904,945 B2
APPLICATION NO. : 17/859261
DATED : February 20, 2024
INVENTOR(S) : Won Ki Song Page 1 of 1

It is certified that error appears in the above-identified patent and that said Letters Patent is hereby corrected as shown below:

In the Claims

Claim 3, Column 9; Line 53; delete "wherein one a first" and insert --wherein a first--.

Signed and Sealed this
Thirtieth Day of April, 2024

Katherine Kelly Vidal
*Director of the United States Patent and Trademark Office*